US012577981B2

(12) United States Patent
Riviere et al.

(10) Patent No.: US 12,577,981 B2
(45) Date of Patent: Mar. 17, 2026

(54) BALL JOINT WITH NOTCHED OUTER RING

(71) Applicant: SKF Aerospace France S.A.S, Montigny-le-Bretonneux (FR)

(72) Inventors: Florent Riviere, Lons le Saunier (FR); Justin Esteve, Crancot (FR); Lucrecia Osegueda, Montain (FR); Vincent Guyard, Assieu (FR)

(73) Assignee: SKF Aerospace France S.A.S, Montigny-le Bretonneux (FR)

( * ) Notice: Subject to any disclaimer, the term of this patent is extended or adjusted under 35 U.S.C. 154(b) by 519 days.

(21) Appl. No.: 17/853,546

(22) Filed: Jun. 29, 2022

(65) Prior Publication Data

US 2023/0026105 A1     Jan. 26, 2023

(30) Foreign Application Priority Data

Jul. 21, 2021     (FR) ........................................ 2107835

(51) Int. Cl.
F16C 11/06          (2006.01)
(52) U.S. Cl.
CPC ................................. F16C 11/0623 (2013.01)
(58) Field of Classification Search
CPC ... F16C 11/06; F16C 11/0604; F16C 11/0609; F16C 11/0614; F16C 11/068; F16C 11/0685
See application file for complete search history.

(56) References Cited

U.S. PATENT DOCUMENTS

| | | | |
|---|---|---|---|
| 2,400,506 A | 5/1946 | Heim | |
| 2,626,841 A | 1/1953 | Potter | |
| 2,947,063 A | 8/1960 | Teeple | |
| 2,952,901 A | 9/1960 | Lee | |
| 2,973,227 A | 2/1961 | Richard | |
| 3,221,391 A * | 12/1965 | Heim ...................... | F16C 43/02 |
| | | | 29/441.1 |
| 3,371,398 A | 3/1968 | Patterson et al. | |
| 3,574,429 A | 4/1971 | Reising | |
| 4,080,015 A | 3/1978 | Greby | |
| 4,337,559 A | 7/1982 | Rangel | |

(Continued)

FOREIGN PATENT DOCUMENTS

| | | | | |
|---|---|---|---|---|
| AT | 511700 B1 * | 2/2013 | ......... | F16C 11/0609 |
| DE | 1175494 B * | 8/1964 | | |

(Continued)

OTHER PUBLICATIONS

Office action for GB2209360.3 dated Feb. 19, 2025.

*Primary Examiner* — Jonathan P Masinick
(74) *Attorney, Agent, or Firm* — The Garcia-Zamor Law Firm; Ruy Garcia-Zamor

(57)          ABSTRACT
A ball joint having an outer ring and an inner ring respectively including an interior surface and an exterior surface in contact one against the other. The outer ring including two opposite radial front faces axially delimiting the interior surface and two diametrically opposite notches formed on the interior surface and opening onto one of the front faces. Furthermore, the material of the outer ring includes an alloy with the formula NiCr19Fe18Nb or an alloy with the formula X6NiCrTiMoVB25-15-2 and the material of the inner ring includes an alloy with the formula CoCr29W5.

8 Claims, 3 Drawing Sheets

(56)     References Cited

U.S. PATENT DOCUMENTS

| | | | | |
|---|---|---|---|---|
| 5,265,965 | A | 11/1993 | Harris et al. | |
| 8,337,087 | B2 * | 12/2012 | Blachon | F16C 11/0614 |
| | | | | 384/208 |
| 8,876,390 | B2 * | 11/2014 | McNeil | F16C 33/12 |
| | | | | 384/912 |
| 10,788,101 | B2 * | 9/2020 | Dreixler | F16G 15/12 |
| 11,066,860 | B1 | 7/2021 | Pretty | |
| 2008/0056812 | A1 * | 3/2008 | Coenen | F16C 11/069 |
| | | | | 403/122 |
| 2009/0008081 | A1 | 1/2009 | Bouligny | |
| 2009/0080818 | A1 * | 3/2009 | Sasaki | F16C 11/0614 |
| | | | | 384/203 |
| 2010/0269629 | A1 * | 10/2010 | Nunn | F16C 11/0614 |
| | | | | 384/276 |
| 2023/0021400 | A1 * | 1/2023 | Riviere | F16C 33/12 |

FOREIGN PATENT DOCUMENTS

| | | | | |
|---|---|---|---|---|
| DE | 102020102971 | A1 * | 8/2021 | .......... F16C 11/0614 |
| EP | 1816359 | A2 | 8/2007 | |
| EP | 2791518 | A1 | 10/2014 | |
| EP | 2905445 | A1 | 12/2015 | |
| EP | 3159084 | A1 | 4/2017 | |
| EP | 3232074 | A1 | 10/2017 | |
| FR | 2506868 | A1 * | 12/1982 | |
| GB | 1146886 | A | 3/1969 | |
| GB | 1268499 | A | 3/1972 | |
| JP | H01172625 | A | 7/1989 | |
| JP | H09151947 | A | 6/1997 | |
| JP | 2006057842 | A | 3/2006 | |
| JP | 2012041949 | A | 3/2012 | |
| KR | 20120064995 | A | 6/2012 | |
| WO | 2004/038238 | A1 | 5/2004 | |
| WO | 2013090758 | A1 | 6/2013 | |

* cited by examiner

BALL JOINT WITH NOTCHED OUTER RING

CROSS-REFERENCE TO RELATED APPLICATIONS

This application claims priority to French Patent Application no. 2107835, filed Jul. 21, 2021, the contents of which is fully incorporated herein by reference.

TECHNICAL FIELD

The present invention is generally concerned with ball joints and more particularly with ball joints including a notched outer ring. To be more precise, the invention relates to a ball joint including a notched outer ring and having the benefit of a mechanical strength and a corrosion resistance suitable for operation under high temperature conditions, as well as a method of manufacturing this kind of ball joint.

PRIOR ART

A ball joint typically comprises an outer ring and an inner ring. The outer and inner rings respectively include an interior surface and an exterior surface in contact forming sliding surfaces for relative movement of the outer and inner rings.

Depending on their location, some ball joints are called upon to function under conditions of high temperature, above 300° C. In order to be able to guarantee the integrity of the ball joints, it is imperative that their mechanical strength be maintained under such conditions.

According to one particular existing method, the manufacture of a ball joint is based on assembling a notched outer ring and an inner ring.

In a first step, the inner ring is inserted in the outer ring with the aid of the notches formed in the bore of the outer ring. The inner ring is then pivoted inside the outer ring until the respective interior and exterior surfaces of the outer and inner rings are in direct contact one against the other to allow relative movement thereof.

The ball joint with notched outer ring obtained is termed a loader slot bearing.

Bronze and stainless steel, for example corrosion-resistant steel (CRES), are the materials classically used to form the outer ring of a ball joint including a notched outer ring.

However, these conventional materials lose their mechanical strength properties under conditions of high temperature, in particular at temperatures above 300° C. Moreover, in the case of CRES steel, the corrosion resistance properties are also reduced.

Existing ball joints with a notched outer ring therefore cannot be used in applications involving high temperatures.

Other types of ball joints may be used at high temperatures. For example, a split ball joint is manufactured by assembling an inner ring divided into two parts inside an outer ring. This kind of ball joint is referred to as a split bearing.

However, this method of manufacturing split ball joints is costly.

SUMMARY OF THE INVENTION

The invention therefore has for object remedying these disadvantages and proposing a relatively low cost method of manufacture enabling a ball joint to be obtained the mechanical strength and corrosion resistance properties of which are suitable for applications under conditions of temperature above 300° C.

There is therefore proposed a ball joint comprising an outer ring and an inner ring respectively including an interior surface and an exterior surface in contact one against the other, the outer ring comprising two opposite radial front faces axially delimiting the interior surface and two diametrically opposite notches formed on the interior surface and opening onto one of the front faces.

Furthermore, the material of the outer ring includes an alloy with the formula NiCr19Fe18Nb or an alloy with the formula X6NiCrTiMoVB25-15-2 and the material of the inner ring includes an alloy with the formula CoCr29W5.

The alloys with the formula NiCr19Fe18Nb, formula X6NiCrTiMoVB25-15-2 and formula CoCr29W5 are superalloys the mechanical strength and corrosion resistance properties of which are able to withstand conditions of high temperature, in particular above 300° C.

The combination of an outer ring made of a material with the formula NiCr19Fe18Nb or X6NiCrTiMoVB25-15-2 and an inner ring made of a material with the formula CoCr29W5 is particularly advantageous for use of the ball joint at high temperatures, without affecting the sliding properties of the respective interior and exterior surfaces of the outer and inner rings for relative movement thereof.

In accordance with one embodiment, the two notches may be sized so that the radial gap between the two notches is larger than the outside diameter of the inner ring.

In accordance with one embodiment, the interior surface of the outer ring may be spherical and concave and the exterior surface of the inner ring is spherical and convex.

The invention also concerns a method of assembling a ball joint, comprising:

a step of assembling an outer ring and an inner ring, the outer ring comprising an interior surface, two opposite radial front faces axially delimiting the interior surface, and two diametrically opposite notches formed on the interior surface and opening onto at least one of the front faces, the inner ring being inserted in the outer ring via the two notches so that the rotation axes of the outer and inner rings are perpendicular; and a step of pivoting the inner ring 90° inside the outer ring so that the respective interior and exterior surfaces of the outer and inner rings are radially in contact one against the other and the rotation axes of said outer rings are coaxial.

Furthermore, the material of the outer ring includes an alloy with the formula NiCr19Fe18Nb or an alloy with the formula X6NiCrTiMoVB25-15-2 and the material of the inner ring includes an alloy with the formula CoCr29W5.

The method of manufacture preferably comprises, after the pivoting step, a step of lubricating the interior surface of the outer ring and the exterior surface of the inner ring.

The lubricant may advantageously include molybdenum bisulphide or graphite.

In accordance with one embodiment, the method of manufacture may further comprise, before the assembly step, a step of manufacturing the outer and inner rings.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. Other objects, advantages and features will emerge from the following description given by way of illustration only and with reference to the appended drawings, in which.

DETAILED DESCRIPTION OF THE INVENTION

Figure 1:
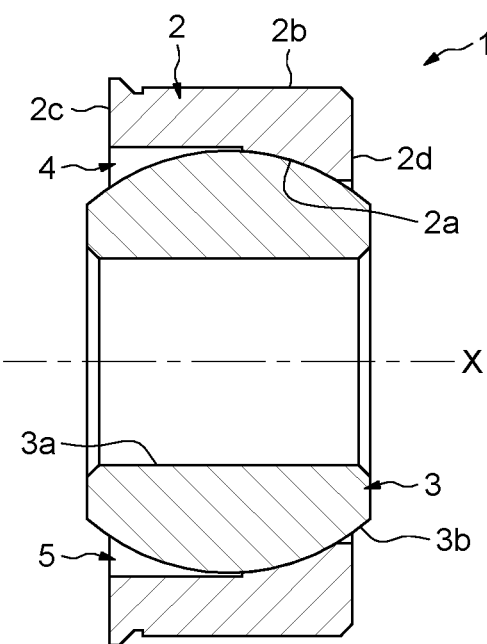
FIG. 1 is a view in section of a ball joint in accordance with one embodiment of the invention comprising an outer ring and an inner ring.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. FIG. 1 illustrates a ball joint 1 comprising an outer ring 2 and an inner ring 3 both coaxial with an axis X.

In accordance with the embodiment illustrated, the ball joint 1 is a radial ball joint.

The outer ring 2 includes an interior surface 2a forming bore and an exterior surface 2b radially opposite the interior surface 2a. The outer ring 2 also includes two opposite radial front faces 2c, 2d axially delimiting the interior surface 2a and the exterior surface 2b.

The inner ring 3 includes an interior surface 3a forming a bore and an exterior surface 3b radially opposite the interior surface 3a. The inner ring 3 also includes two opposite radial front faces (no reference number) axially delimiting the interior surface 3a and the exterior surface 3b.

The interior surface 2a of the outer ring and the exterior surface 3b of the inner ring are in direct contact one against the other to allow relative movement of the exterior and inner rings 2, 3. In the embodiment illustrated, the interior surface 2a of the outer ring and the exterior surface 3b of the inner ring are in contact one against the other in the radial direction.

Figure 3:
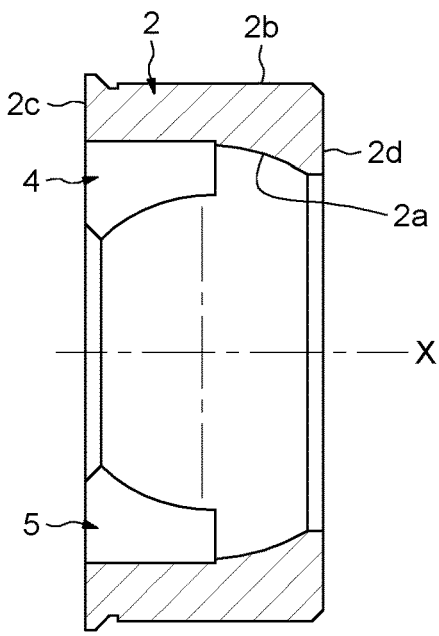
FIG. 3 is a view in section of the outer ring of the ball joint from FIG. 1 before being assembled with the inner ring.

The outer ring 2, illustrated in FIG. 3, further includes two diametrically opposite notches 4 and 5 formed on the interior surface 2a and opening onto the front face 2c. The notches 4, 5 extend axially. The notches 4, 5 extend axially on the interior surface 2a remaining at an axial distance from the front face 2d. In other words, the notches 4, 5 do not open onto the front face 2d. As will be described in more detail hereinafter, the notches 4, 5 enable insertion of the inner ring 3 into the outer ring 2.

The notches 4 and 5 are sized so that the radial gap between the bottoms of the two notches 4 and 5 is larger than the outside diameter of the inner ring 3 so as to facilitate mounting and demounting the inner ring 3.

In the example illustrated the interior surface 2a of the outer ring is spherical and concave and the exterior surface 3b of the inner ring is spherical and convex so as to form a spherical ball joint.

The material of the outer ring 2 includes an alloy with the formula NiCr19Fe18Nb or an alloy with the formula X6NiCrTiMoVB25-15-2. The outer ring 2 is preferably made entirely of an alloy with the formula NiCr19Fe18Nb or an alloy with the formula X6NiCrTiMoVB25-15-2.

The nickel-based alloy with the formula NiCr19Fe18Nb is for example the material known under the trade mark Inconel® 718.

The alloy with the formula X6NiCrTiMoVB25-15-2 is for example the material known under the trade mark A286®.

Moreover, the material of the inner ring 3 includes an alloy with the formula CoCr29W5. The inner ring 3 is preferably made entirely of an alloy with the formula CoCr29W5.

The alloy with the formula CoCr29W5 is for example the material known under the trade mark Alacrite® 602 or Stellite® 6.

The mechanical strength and corrosion resistance properties of the alloys with the formula NiCr19Fe18Nb, with the formula X6NiCrTiMoVB25-15-2 and with the formula CoCr29W5 are able to withstand conditions of high temperature, above 300° C.

The combination of these materials of the exterior and inner rings 2 and 3 enables use of the ball joint 1 with the notched outer ring at high temperatures, above 300° C.

The combination of these materials further imparts the necessary sliding properties to the interior surface 2a and the exterior surface 3b respectively of the exterior and inner rings for relative movement thereof.

Figure 2:
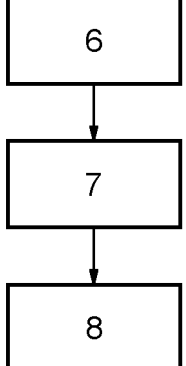
FIG. 2 illustrates a method of manufacturing the ball joint in accordance with one embodiment of the invention from FIG. 1.

FIG. 2 illustrates a method of manufacturing the ball joint 1.

In a first or assembly step 6 the inner ring 3 including an alloy with the formula CoCr29W5 is inserted in the outer ring 2 including an alloy with the formula NiCr19Fe18Nb or an alloy with the formula X6NiCrTiMoVB25-15-2 by passing it through the notches 4 and 5.

Figure 4:
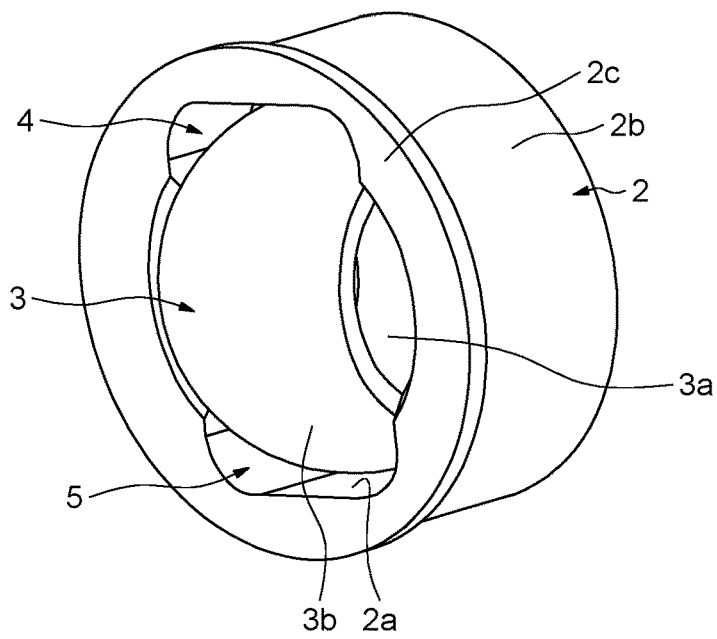
FIG. 4 is a perspective view of the ball joint from FIG. 1 in an intermediate position, after assembly with the inner ring.

The inner ring 3 is then in an intermediate position, illustrated in FIG. 4, in which the rotation axes of the outer ring 2 and inner ring 3 are perpendicular. The front faces of the inner ring 3 extend in a plane perpendicular to that of the front faces of the outer ring 2.

In a subsequent pivoting step 7 the inner ring 3 is pivoted 90° inside the outer ring 2 so that the interior surface 2a and the exterior surface 3b respectively of the outer ring 2 and of the inner ring 3 are disposed face-to-face.

Figure 5:
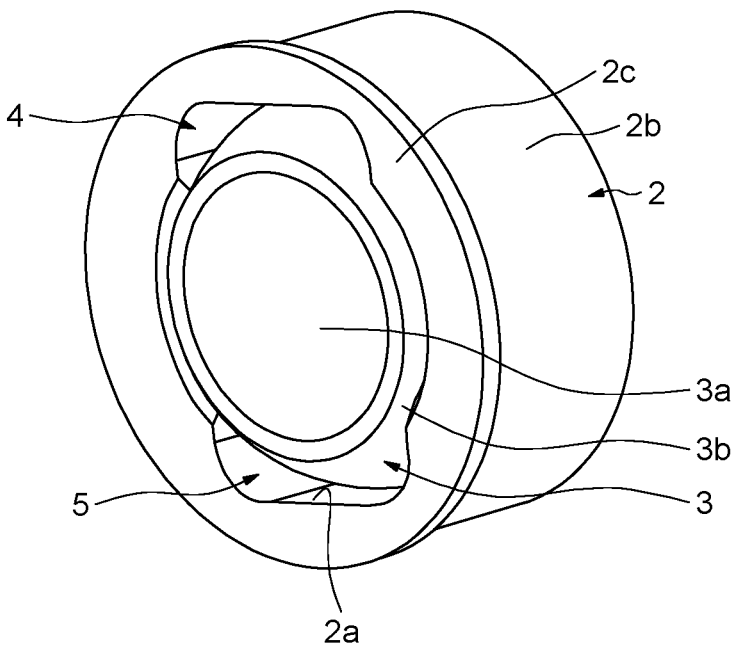
FIG. 5 is a perspective view of the ball joint from FIG. 1 after pivoting the inner ring in the outer ring.

As can be seen in FIG. 5, after this pivoting the outer ring 2 and the inner ring 3 are coaxial and their interior surface 2a and exterior surface 3b respectively are in contact one against the other to allow relative movement of the outer and inner rings 2, 3. The rotation axes of the inner ring 3 and the outer ring 2 are coaxial. The front faces of the inner ring 3 and the front faces of the outer ring 2 extend in the same radial plane or alternatively in two parallel radial planes.

Moreover, the method of manufacture may comprise a step 8 of lubrication of the interior surface 2a of the outer ring 2 and of the exterior surface 3b of the inner ring 3.

The lubricant is for example a dry lubricant and may include molybdenum bisulphide or graphite.

In accordance with one embodiment, the method of manufacture may further comprise, before the assembly step 6, a step of manufacturing the outer and inner rings 2, 3. The step of manufacturing the outer and inner rings 2, 3 includes the formation of the two notches 4, 5 on one of the front faces 2c, 2d of the outer ring 2.

The invention claimed is:

1. A ball joint comprising:
    an outer ring having an interior surface and an inner ring having an exterior surface in contact against the interior surface of the outer ring,
    the outer ring comprising a first radial front surface and a second radial front surface which are oppositely positioned to axially delimit the interior surface,
    the outer ring defining two diametrically opposite notches formed on the interior surface and opening onto the first radial front surface, a perimeter of the two diametrically opposite notches along the first radial front surface each having a central portion that forms a bottom that is linear such that a radial distance between the bottoms of each of the diametrically opposed notches is greater than an outside diameter of the inner ring, when viewing the first radial front surface perpendicularly along an axis of rotation the perimeter of each of the two diametrically opposite notches includes a first arcuate surface and a second arcuate surface each on an opposite end of the central portion that forms a bottom that is linear,
    wherein the material of the outer ring includes an alloy with the formula NiCr19Fe18Nb or an alloy with the formula X6NiCrTiMoVB25-15-2 and the material of the inner ring includes an alloy with the formula CoCr29W5.

2. The ball joint according to claim 1, in which the two notches are configured so that a radial gap between the two notches is larger than an outside diameter of the inner ring.

3. The ball joint according to claim 1, wherein the interior surface of the outer ring is spherical and concave and the exterior surface of the inner ring is spherical and convex.

4. A method of manufacturing a ball joint comprising:
    a step of assembling an outer ring and an inner ring, the outer ring comprising an interior surface, first and second opposite radial front faces axially delimiting the interior surface and two diametrically opposite notches formed on the interior surface and opening onto the first opposite radial front face, a perimeter of the two diametrically opposite notches along the first radial front surface each having a central portion that forms a bottom that is linear such that a radial distance between the bottoms of each of the diametrically opposed notches is greater than an outside diameter of the inner ring, when viewing the first radial front surface perpendicularly along an axis of rotation the perimeter of each of the two diametrically opposite notches includes a first arcuate surface and a second arcuate surface each on an opposite end of the central portion that forms a bottom that is linear, the inner ring being inserted in the outer ring via the two notches so that rotation axes of the outer ring and the inner ring are perpendicular; and
    a step of pivoting the inner ring 90° inside the outer ring so that the respective interior surface and exterior surface of the outer ring and the inner ring are radially in contact one against the other and the rotation axes of said outer rings are coaxial, wherein
    the material of the outer ring includes an alloy with the formula NiCr19Fe18Nb or an alloy with the formula X6NiCrTiMoVB25-15-2 and the material of the inner ring includes an alloy with the formula CoCr29W5.

5. The method of manufacture according to claim 4, comprising, after the pivoting step, a step of lubricating the interior surface of the outer ring and the exterior surface of the inner ring.

6. The method of manufacture according to claim 5, wherein the lubricant includes molybdenum disulphide or graphite.

7. The method according to claim 4, further comprising, before the assembly step, a step of manufacturing the outer ring and the inner ring.

8. A ball joint comprising:
    an outer ring having an interior surface and an inner ring having an exterior surface in contact against the interior surface of the outer ring,
    the outer ring comprising a first radial front surface and a second radial front surface which are oppositely positioned to axially delimit the interior surface, and
    the outer ring defining two diametrically opposite notches formed on the interior surface and opening onto the first radial front surface, a perimeter of the two diametrically opposite notches along the first radial front surface each having a central portion that forms a bottom that is linear such that a radial distance between the bottoms of each of the diametrically opposed notches is greater than an outside diameter of the inner ring, when viewing the first radial front surface perpendicularly along an axis of rotation the perimeter of each of the two diametrically opposite notches includes a first arcuate surface and a second arcuate surface each on an opposite end of the central portion that forms a bottom that is linear.

* * * * *